INVENTORS
GUNTHER W. BALZ
FORREST P. LEIPOLD

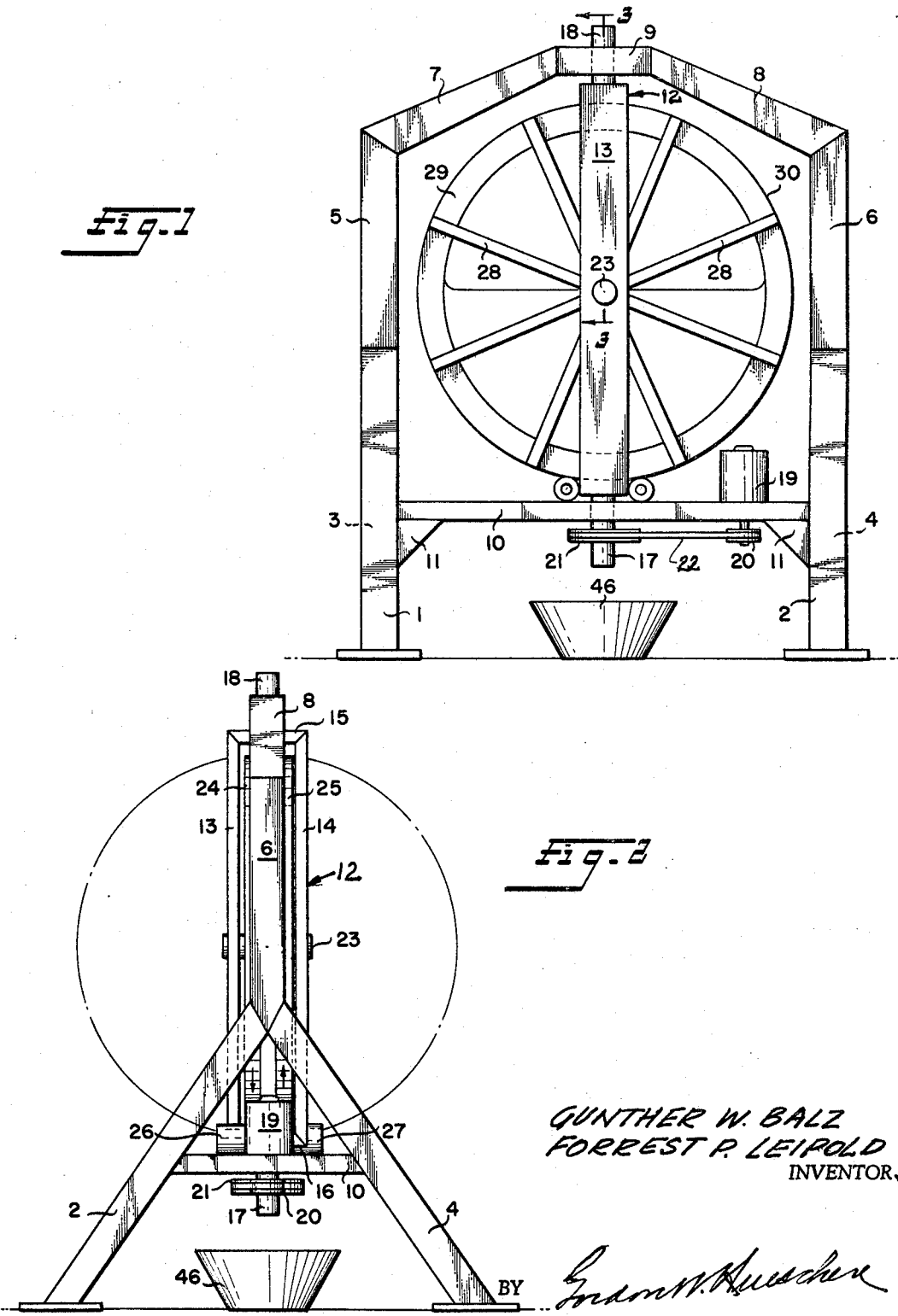

BY
ATTORNEY

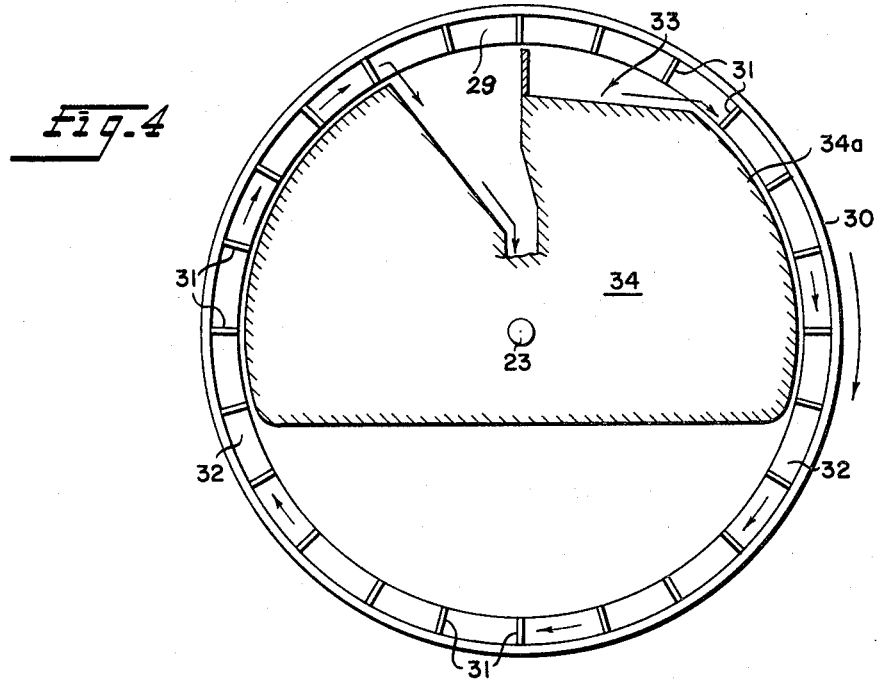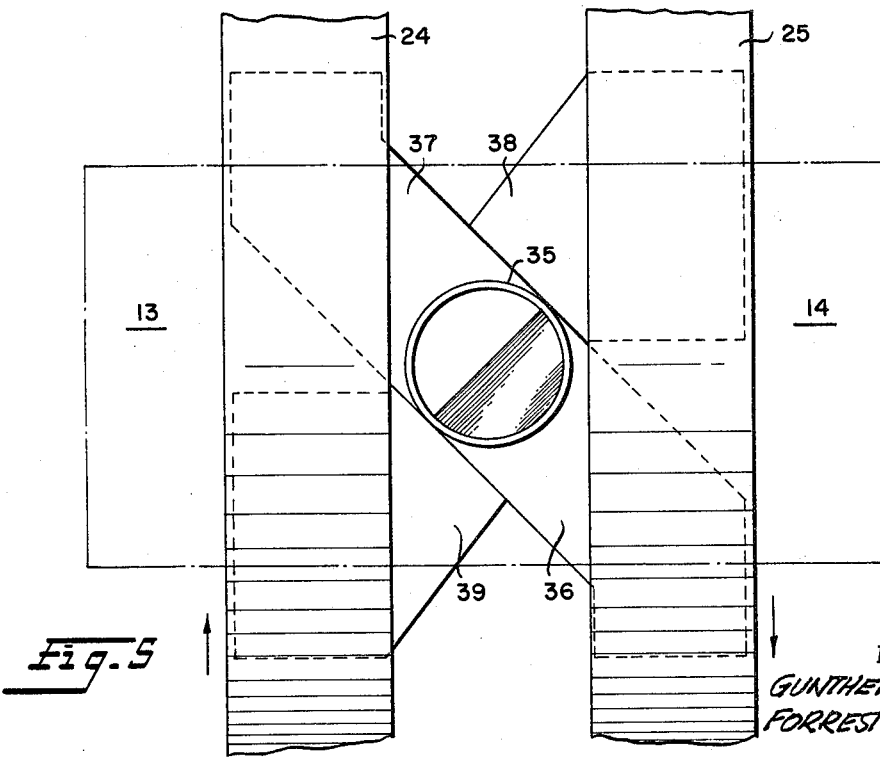

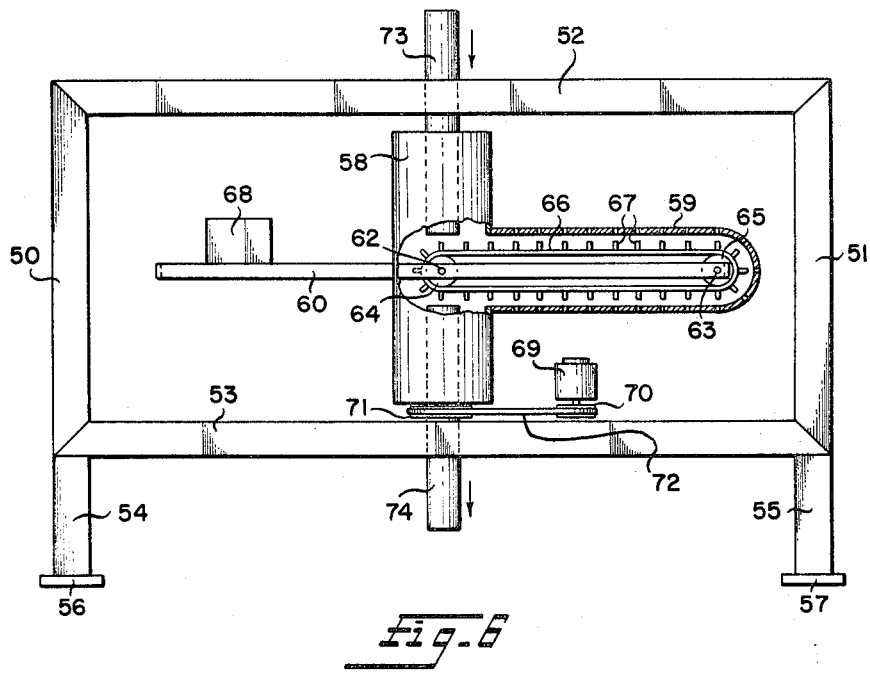
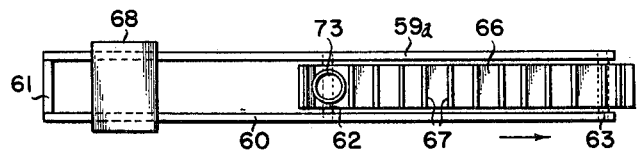
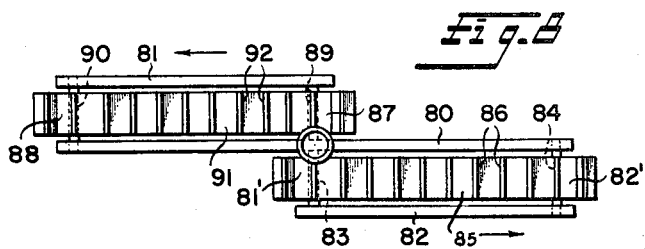

3,386,180
CONTINUOUS CENTRIFUGAL DEVICE
Gunther W. Balz and Forrest P. Leipold, Kalamazoo, Mich., assignors to Roto-Finish Company, Kalamazoo, Mich., a corporation of Michigan
Filed Feb. 16, 1966, Ser. No. 538,120
14 Claims. (Cl. 34—8)

ABSTRACT OF THE DISCLOSURE

A centrifugal apparatus for treating discrete products such as articles or materials having a frame and subassembly mounted on the frame adapted to rotate about an axis, loading and unloading stations disposed at the axis, and a conveyor assembly forming a portion of the rotatable subassembly adapted to transport or actively convey the articles to a point spaced apart from the axis to cause the articles or materials to revolve about the axis thereby subjecting them to centrifugal force for treating the articles or materials with a substance or removing a substance therefrom, and transporting or actively conveying the articles or materials back to the axis to be discharged without stopping the apparatus.

---

The present invention relates to a centrifugal apparatus, and is especially concerned with an apparatus designed for the continuous treatment of articles, such as the drying of finished and washed parts by means of centrifugal force.

Apparatus for removing water and other liquids from articles by means of centrifugal force is known in the art. However, such prior art apparatus does not lend itself to a continuous process, but most be operated as a batch process, that is a process where the apparatus must be stopped and emptied after each load has been dried.

It is one object of the present invention to provide an apparatus adapted to treat articles of various sizes and shapes, such as for purposes of drying. It is a further object to provide such an apparatus utilizing centrifugal force for removing water or other liquids from the articles to be dried. It is still further an object to provide a drying apparatus of the type described which may be utilized in a continuous operation type of process. It is an additional object to provide a centrifugal apparatus for treating articles by applying such processes known in the art as washing, enameling, galvanizing, and oil-separation (including deoiling). The accomplishment of the foregoing and additional objects will become more fully apparent hereinafter.

According to the invention, a centrifugal apparatus is provided having a structure mounted for rotation, preferably about a substantially vertical axis. The rotating structure is provided with axially positioned loading and discharge means, and conveyor means adapted to transfer the articles to be treated from the axial loading zone to a peripheral zone, and subsequently to the axial discharge zone. While in the peripheral zone the articles acquire a high linear velocity, the resulting centrifugal force causing adherent liquid to be thrown off. The rate of conveying is so adjusted that the articles are treated by the time they reach the discharge zone, and are then discharged from the apparatus.

As used herein in the specification and claims, the term "substantially vertical" defines an axis disposed at an angle with respect to horizontal of greater than 45° and up to and including 90°. An angle of 90° is preferred.

The invention in its preferred embodiment is illustrated by the accompanying drawings in which:

FIG. 1 is a side elevational view of the apparatus of the invention.

FIG. 2 is a side elevational view taken in a direction disposed at an angle of 90° from that of FIG. 1.

FIG. 4 is a cross-sectional view of one of the wheels shown in FIGS. 2 and 3.

FIG. 5 is a top schematic view of the parts distribution housing.

FIG. 6 is a cross-sectional view of another embodiment of the invention.

FIG. 7 is a top view of the conveyor assembly shown in FIG. 6 and

FIG. 8 is a top view of the conveyor system of an alternative embodiment of the invention shown in FIGS. 6 and 7.

Reference is now made to the accompanying drawings for a better understanding of the invention, wherein all the parts are numbered and wherein the same numbers are used to refer to corresponding parts throughout.

Figure 3:
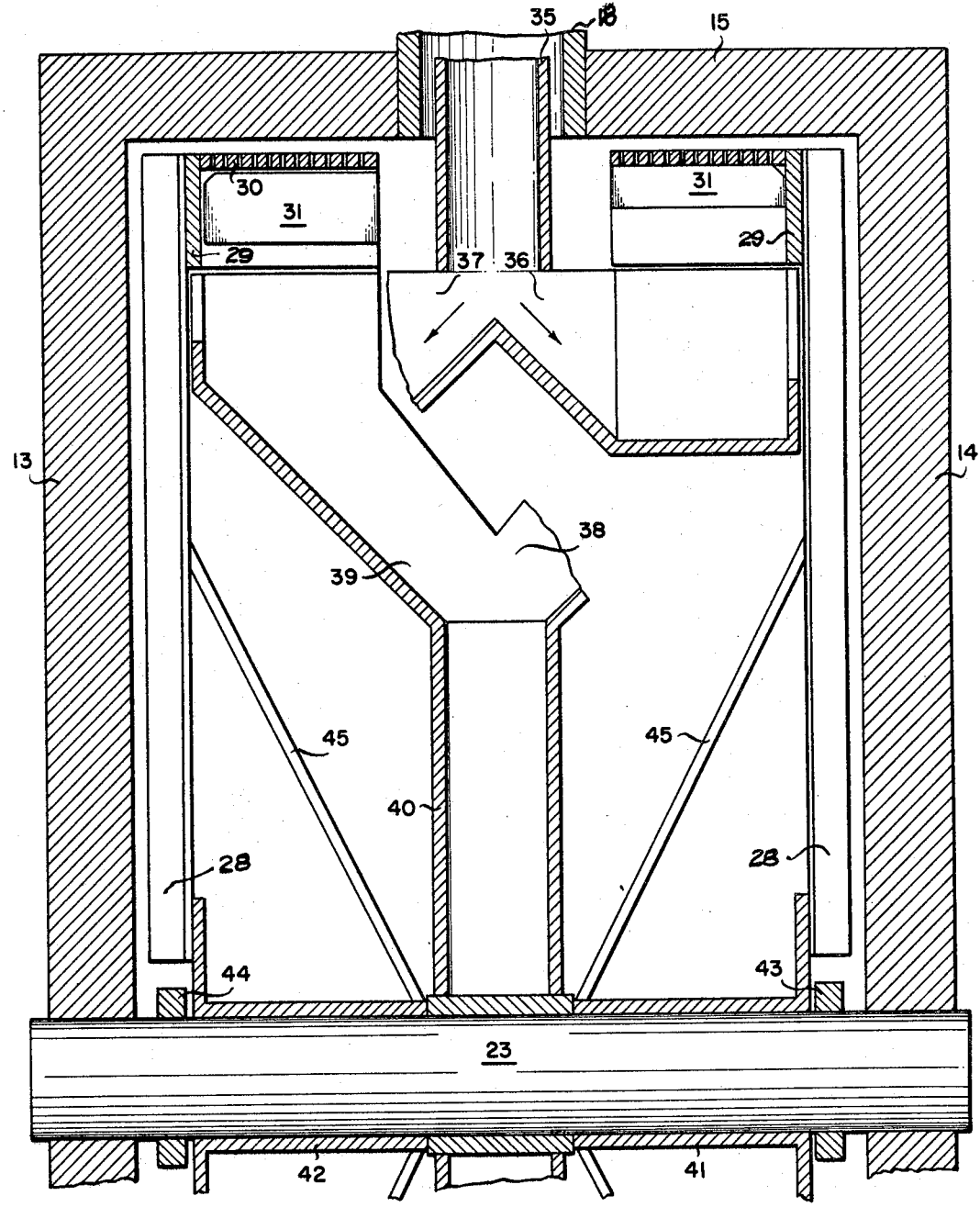
FIG. 3 is a cross-sectional view of a portion of the apparatus taken at the line 3—3 of FIG. 1.

Referrings to FIGS. 1 and 2, the apparatus is shown having a frame comprising oblique legs 1, 2, 3, and 4, vertical frame members 5 and 6, oblique frame members 7 and 8, and a transverse frame member 9. Mounted on the oblique legs 1, 2, 3, and 4 is a horizontal platform 10 reinforced by supporting brackets 11.

Rotatably mounted on the platform 10 is a rotating subassembly comprising a gimbel 12 having vertical frame members 13 and 14 and an upper transverse frame member 15, and a lower transverse frame member 16. The gimbel 12 is rotatably mounted on a lower tubular shaft 17 journaled in the platform 10 and an upper tubular shaft 18 journaled in the upper transverse member 15. A motor 19 having a pulley 20 mounted on a shaft thereof drives the gimbel by means of a pulley 21 affixed to the lower tubular shaft 17 and a belt 22 operatively connecting the pulleys 20 and 21.

Rotatably mounted on a shaft 23 supported by the vertical frame members 13 and 14 are a pair of counter-rotating wheels 24 and 25. The wheels are driven by motors 26 and 27. Each wheel, as shown in FIG. 3, comprises radial wheel members 28, a radial wall 29 of limited extent, and a perforated or foraminous circumferential axial wall 30. As seen in greater detail in FIG. 4, the wheel is provided with partitions or dividers 31 which, together with the radial wall 29 and circumferential axial wall 30, define a plurality of circumferential compartments 32.

FIGS. 3, 4, and 5 illustrate in detail the various components of the part distribution and position holding housing 33 which is affixed to the gimbel 12, and rotates about the vertical axis with the gimbel. The housing 33 comprises a position holding housing 34 having a circumferential axial wall 34a serving the function of confining the parts to the compartments in the upper portion of the wheel after loading and prior to discharge. As shown in FIGS. 3 and 5, the distribution housing comprises an article loading port, chute or chamber 35 positioned in the tubular shaft 18 terminating in a right inlet loading chute 36 and a left inlet loading chute 37 for loading the right and left wheels, respectively. The parts discharge system comprises a right discharge chute 38 and a left discharge chute 39 both merging into a common discharge chute or chamber 40.

Additional details of the wheels are shown in FIG. 3 comprising wheel bearing surfaces 41 and 42 and wheel positioning collars 43 and 44. Diagonal braces 45 are provided for strengthening the wheel.

The apparatus is placed in operation by applying power to the motors of the apparatus, causing the gimbel to rotate. Additionally, the wheels are caused to rotate about a horizontal axis in opposite directions.

The products to be treated, such as articles or materials, are loaded into the loading chamber or chute 35 and distribute themselves between the right and left inlet ducts or chutes 36 and 37, and are loaded into the compartments near the top of the right and left wheels. As the rotation of the wheels about their horizontal axis continues, the articles or materials are moved radially outward with respect to the axis of rotation of the gimbel, reaching their greatest distance and consequently greatest linear velocity at the equatorial line of the wheels, and subsequently decreasing in linear velocity as they reach the bottom of the wheels, but increasing again as they start upwardly, reaching a maximum velocity at the equatorial line at the other side of the wheel, finally being discharged in a treated condition into one of the discharge chutes 38 or 39. The parts fall into the common discharge chute 40, and are ultimately discharged at the bottom of the apparatus into a suitable container 46.

Modified embodiments of the invention are shown in FIGS. 6-8. In the embodiment of FIGS. 6 and 7, the apparatus comprises vertical frame members 50 and 51 and horizontal frame members 52 and 53, mounted on legs 54 and 55 supported on pedestals 56 and 57.

The moving portion of the apparatus comprises a vertical housing 58 and a horizontal perforated housing 59 affixed at one end to the vertical housing 58. At the upper portion of the vertical housing 58 is a tubular part loading port, chute or chamber 73 rotatably journaled in the horizontal frame member 52. At the other end of the housing is affixed a tubular part discharge chute or chamber 74 rotatably journaled in the lower horizontal frame member 53.

Horizontally mounted between the ends of the part loading chute and the part discharge chute are a pair of horizontal arms 59a and 60 connected together at one end of a transverse frame member 61, at the center by a shaft 62, and at the other end by another shaft 63. A rotating drum 64 is mounted on the shaft 62, and another rotating drum 65 is mounted on the shaft 63. A conveyor belt 66 having transverse cleats 67 is mounted over the drums 64 and 65. A motor, not shown, is provided at the vertical housing or gimbel rotation axis for driving the conveyor belt system. A counterweight 68 is mounted at one end of the horizontal arms 59a and 60 for counterbalancing the conveyor belt system. A motor 69 operatively connected to the rotating housing by means of pulleys 70 and 71, and an endless belt 72, cause the portion of the apparatus mounted on the housing 58 to rotate about a vertical axis.

In operation, power is applied to the apparatus, as by motor 69, in order to rotate the gimbel-mounted apparatus about a vertical axis. Additionally the conveyor system comprising the drums 64 and 65 and the conveyor belt 66 are caused to move. Products, such as articles or materials, to be treated, are introduced into the article loading port, chute or chamber 73 and fall on the conveyor belt, whence they are transported peripherally to the end of the conveyor system. As the parts approach the periphery of the system, they acquire a high linear velocity, and an attendant centrifugal force causing adherent liquid to be thrown off. The articles continue over the end of the conveyor system and are returned to the central portion of the apparatus by means of belt 66 and cleats 67, cooperating with the conveyor belt housing 59. When the articles reach the discharge port or chamber 74, they are released and permitted to fall through the chamber into a suitable container.

In the modification shown in FIG. 8, the moving system, instead of having a single conveyor system counterbalanced by a counterweight, is provided with two mutually balancing conveyor systems comprising a common horizontal arm 80, and individual horizontal arms 81 and 82. Rotating drums 81 and 82 mounted on shafts 83 and 84, respectively, support a conveyor belt 85 having transverse cleats 86. Rotatable drums 87 and 88 mounted on shafts 89 and 90, respectively, support a conveyor belt 91 having transverse cleats 92. Although not shown, suitable conveyor belt housings enclose the two conveyor systems, and means for operating the conveyor systems are provided at the axis of the gimbel.

In operation articles or materials are loaded into the loading chute. Some of the articles are directed on to each one of the chutes. The gimbel or vertical housing rotates, while the parts are gradually conveyed to the end of the conveyor system, and subsequently back again to the center of the apparatus, where the parts are dropped into chutes leading into the common part discharge chute, and subsequently discharged into a suitable receptacle.

Although the invention has been described and illustrated in only several embodiments, many other embodiments within the broader concepts of the invention may be utilized. In its broadest concept the invention comprises an apparatus and a method for treating products such as materials or articles by subjecting them to centrifugal force, and, while so subjected, applying or removing secondary or disparate materials with which they are treated, by means of the centrifugal force. According to the invention, a rotating system is provided which rotates about an axis oriented in any desirable position. The products to be treated are introduced at a zone substantially at the axis of rotation, and the treated products also removed at a zone substantially at the axis of rotation, since there is no orbital movement at the axis of rotation. In order to take advantage of the force of gravity for introducing and removing the products to be treated, a vertical axis, or an axis having at least a vertical component, is desirable for certain applications. Gravity can then be utilized to transport the products along the axis of rotation. Means are provided in the apparatus for confining or determining the position of the products to be treated with respect to the axis of rotation, and to move them to a position within the rotating system radially spaced apart from the axis of rotation, causing the products to revolve in an orbit about the axis of rotation of the system at the same radial velocity as the rotating system. The means may be a wheel having compartments, such as illustrated in FIGS. 1-5, a conveyor such as illustrated in FIGS. 6-8, or any other suitable means. In the embodiments illustrated the products treated may be moved radially outwardly at a uniform velocity and then returned to the axis of rotation, also at a uniform velocity, either after 180° or 360° of rotation. In other embodiments the products may be transported to a position radially spaced apart from the axis of rotation and maintained at that position until sufficiently treated, at which time the products are returned to the axis of rotation. In still other embodiments the products may be transported radially away from the axis of rotation to various indexed positions and subsequently returned to the axis of rotation after sufficient treatment.

After the process is complete, the products are returned to a position or zone substantially at the axis of rotation, where they are discharged while being subjected to substantially zero centrifugal force. In the embodiment shown in FIGS. 1-5 the conveying wheels undergo rotation of 360° from the time the products are loaded until they are unloaded. Whether they undergo rotation of 180° or 360° or multiples thereof is immaterial, depending upon special considerations in an individual case. In the embodiment of FIGS. 1–5, the two wheels are mounted on a common axis and are parallel to each other. Alternatively the wheels may be mounted on separate axis and so positioned that they are not perpendicular to each other. For example, in one embodiment, not illustrated, the two wheels are mounted on separate axis and are divergent downwardly. This permits a larger amount of space to be utilized for positioning the loading and unloading systems.

The treatment to which the products are subjected may be a drying process whereby a liquid contained on the products is removed by the centrifugal force to which the liquid is subjected while the products are spaced apart from the axis of rotation of the system. Alternatively, a material such as a paint may be released from the center of the system and sprayed on the products by means of the centrifugal force to which the paint is subjected, excess paint also being removed by centrifugal force.

The present invention in all embodiments provides a novel and improved apparatus for drying or otherwise treating products such as articles or materials by means of centrifugal force. Since the loading and unloading chambers are axially disposed with regard to the rotating portion of the apparatus, both loading and unloading can take place while the apparatus is rotating. During operation, the articles are transported peripherally to acquire a high linear velocity, whereby the resulting centrifugal force causes adhered liquid to be thrown off. The articles are then returned to the axial portion of the rotating apparatus and may be discharged while the apparatus is spinning. The present apparatus may be readily constructed and is relatively inexpensive.

The present apparatus, in addition to use as a dryer, readily lends itself to employment as a washer, enameler, galvanizer, oil-separator (deoiler), or centrifugal caster simply by combining the apparatus with appropriate techniques known in the art.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. A method for treating a discrete product such as an article or material by subjecting said product to centrifugal force, which comprises introducing said product at a zone substantially at the axis of rotation of a rotating system into a compartment defined within said rotating system, confining said product within said compartment, applying a force to said rotating system thereby moving said compartment and the product contained therein to a point within said rotating system radially spaced from said axis of rotation thereby causing said product to revolve in an orbit about said axis at an angular velocity equal to that of said rotating system, thereafter, again moving said compartment and product to a zone substantially at said axis of rotation, and discharging said product from said system.

2. A method according to claim 1 wherein said product is subjected to treatment with a disparate material while under the influence of centrifugal force.

3. A method according to claim 1 wherein said disparate material is a protective coating material.

4. A method according to claim 1 wherein a disparate material is associated with said product when said product is introduced into said rotating system, and wherein said disparate material is removed therefrom by centrifugal force while said product is revolving about said axis of rotation.

5. A centrifugal apparatus for treating discrete products such as articles or materials, comprising support means, a subassembly mounted on said support means for rotation about an axis, and means for rotating said subassembly, said subassembly comprising a frame, loading means adapted to introduce said products into said subassembly at a zone substantially at said axis of rotation, discharge means adapted to remove said products from a zone substantially at said axis of rotation, and conveying means adapted to receive products to be treated at said loading means, convey said products to a position spaced radially from said axis of rotation thereby causing said products to revolve about said axis of rotation, and thereafter convey said products to said discharge means for discharge, whereby the products charged to said apparatus are treated by subjection to centrifugal force, and whereby said thus-treated products are subsequently discharged from said apparatus through said discharge means.

6. A centrifugal apparatus for treating discrete products such as articles or materials, comprising support means, a subassembly mounted on said support means for rotation about an axis, and means for rotating said subassembly, said subassembly comprising a frame, a loading port disposed substantially axially at one end of said subassembly, and a discharge port disposed substantially axially at the other end of said subassembly, and conveying means adapted to receive products to be treated from said loading port, convey said products to the periphery of said subassembly, and convey said products to said discharge port for discharge, whereby the products charged to said apparatus are treated by subjection to centrifugal force, and whereby said thus-treated products are subsequently discharged from said apparatus through said discharge port.

7. A centrifugal apparatus for treating products such as articles or materials, comprising support means, a subassembly mounted on said support means for rotation about a first axis, and means for rotating said subassembly, said subassembly comprising a frame, a wheel mounted on said frame for rotation about a second axis substantially perpendicular to said first axis, and means for rotating said wheel, said wheel having means at the periphery thereof defining a plurality of compartments having at least one foraminous wall permitting a liquid to pass therethrough, means for confining said products within said compartments, a loading means disposed at a zone substantially at said first axis of rotation, and a discharge means disposed at a zone substantially at said first axis of rotation, whereby the products charged to said apparatus are conveyed by rotation of said wheel to the periphery of said subassembly for subjecting said products to centrifugal force, and whereby said thus-treated products are subsequently conveyed to said discharge zone for discharge.

8. A continuous centrifugal apparatus for treating products such as articles or materials, comprising support means, a subassembly mounted on said support means for rotation about a substantially vertical axis, and means for rotating said subassembly, said subassembly comprising a frame, a pair of wheels mounted on said frame for rotation about a substantially horizontal axis, and means for rotating said wheels in opposite directions, said wheels having means at the periphery thereof defining a plurality of compartments having at least one foraminous wall permitting a liquid to pass therethrough, means for confining said articles within said compartments when said compartments are in inverted position at the upper portions of said wheels, a loading port disposed substantially axially at the top of said frame, and a discharge port disposed substantially axially of said frame, whereby the products charged to said apparatus are conveyed by rotation of said wheels to the periphery of said subassembly for subjecting said products to centrifugal force, and whereby said thus-treated products are subsequently conveyed to the axial portion of said subassembly for discharge.

9. A continuous centrifugal apparatus for treating products such as articles or materials, comprising support means, a subassembly mounted on said support means for rotation about a substantially vertical axis, and means for rotating said subassembly, said subassembly comprising a frame, a pair of wheels mounted on said frame for rotation about a substantially horizontal axis, and means for rotating said wheels in opposite directions, said wheels having means at the periphery thereof defining a plurality of compartments having at least one foraminous wall permitting a liquid to pass therethrough, means for confining said articles within said compartments when said compartments are in inverted position at the upper portions of said wheels, a loading port disposed substantially axially at the top of said frame terminating in duct means adapted to guide said products to a loading zone for the compartments of each of said wheels, and a discharge port disposed substantially axially of said frame having duct means adapted to receive treated products from the compartments of both wheels, whereby the articles charged to said apparatus are conveyed by rotation of said wheels to the periphery of said subassembly for subjecting said products to centrifugal force, and whereby said thus-treated products are subsequently conveyed to the axial portion of said subassembly for discharge.

10. A continuous centrifugal apparatus for treating products such as articles or materials, comprising a supporting base, a subassembly mounted on said base for rotation about a substantially vertical axis, and means for rotating said subassembly, said subassembly comprising a frame, a pair of wheels mounted on said frame for rotation about a substantially horizontal axis, and means for rotating said wheels in opposite directions, each of said wheels having a radial wall of limited extent at the periphery thereof, a foraminous axial wall having one edge engaging and affixed to the outer edge of said radial wall, and a plurality of means defining compartments at the periphery thereof, a housing having an arcuate axial wall positioned for confining said products within said compartments when said compartments are in inverted position at the upper portions of said wheels, a loading port disposed substantially axially at the top of said frame terminating at its lower end in a pair of ducts, one leading to the compartments of each of said wheels and adapted to guide said products to said compartments, and a discharge port substantially axially disposed at said frame having a pair of ducts connected thereto, each of said ducts having an open end disposed to receive products from discharge zones of said compartments, whereby the products charged to said apparatus are conveyed to the periphery of said subassembly for subjecting said products to centrifugal force, and whereby said products are subsequently conveyed to the discharge portions of said subassembly for discharge.

11. A continuous centrifugal apparatus for treating products such as articles or materials, comprising a supporting base, a subassembly mounted on said base for rotation about a substantially vertical axis, and means for rotating said subassembly, said subassembly comprising a frame, a pair of wheels mounted on said frame for rotation about a substantially horizontal axis, and means for rotating said wheels in opposite directions, each of said wheels having a radial wall of limited extent at the periphery thereof, a foraminous axial wall having one edge engaging and affixed to the outer edge of said radial wall, and a plurality of transverse partitions affixed to at least one of said walls, said radial wall, said axial wall, and said partitions cooperating to define a plurality of compartments, a housing having an arcuate axial wall positioned for confining said products within said compartments when said compartments are in inverted position at the upper portions of said wheels, a loading port disposed substantially axially at the top of said frame terminating at its lower end in a pair of ducts, one leading to the compartments of each of said wheels and adapted to guide said products to said compartments, and a discharge port substantially axially disposed at said frame having a pair of ducts connected thereto, each of said ducts having an open end disposed to receive products from discharge zones of said compartments, whereby the products charged to said apparatus are conveyed to the periphery of said subassembly for subjecting said products to centrifugal force, and whereby said products are subsequently conveyed to the discharge portions of said subassembly for discharge.

12. A centrifugal apparatus for treating products such as articles or materials, comprising a supporting base, a subassembly mounted on said base for rotation about an axis, and means for rotating said subassembly, said subassembly comprising a first frame, a second frame mounted on said first frame comprising a pair of radial arms one arm extending radially from each side of the axis of rotation of said subassembly, conveyor means mounted on at least one of said arms arranged to move said products to a position spaced from said axis of rotation and subsequently to return said products to said axis of rotation, loading means disposed at a zone substantially at the axis of rotation of said subassembly adapted to deposit said products on said conveyor means at the axially positioned end thereof, and discharge means disposed at a zone substantially at the axis of rotation of said subassembly and arranged to receive returning products from the axially positioned end of said conveyor means, whereby the products charged to said apparatus are conveyed to the periphery of said subassembly for subjecting said products to centrifugal force and whereby said products are subsequently conveyed to the axial portion of said subassembly and discharged.

13. A continuous centrifugal apparatus for treating products such as articles or materials, comprising a supporting base, a subassembly mounted on said base for rotation about a substantially vertical axis, and means for rotating said subassembly, said subassembly comprising a vertical frame, a substantially horizontal frame mounted on said vertical frame comprising a pair of radial arms, one arm extending radially from each side of the vertical axis of said vertical frame, a substantially horizontal conveyor means mounted on one of said arms comprising a pair of roller means, an endless belt mounted over said roller means having a plurality of transverse cleats affixed thereto, and a housing mounted about said belt cooperating with said belt and said cleats to define a plurality of compartments adapted to confine said products, a counterweight mounted on the other arm of said horizontal frame counterbalancing the arm supporting said conveyor means, a substantially axially positioned loading port disposed at the top of said vertical frame adapted to deposit said articles on said endless belt at the axially positioned end of said conveyor means, and a discharge port substantially axially disposed at the bottom portion of said vertical frame arranged to receive returning products from the bottom of the axially positioned end of said conveyor means, whereby the products charged to said apparatus are conveyed to the periphery of said subassembly for subjecting said products to centrifugal force and whereby said products are subsequently conveyed to the axial portion of said subassembly and discharged.

14. A continuous centrifugal drying apparatus for treating products such as articles or materials, comprising a supporting base, a subassembly mounted on said base for rotation about a substantially vertical axis, and means for rotating said subassembly, said subassembly comprising a substantially vertical frame, a substantially horizontal frame mounted on said vertical frame comprising a pair of radial arms, one arm extending radially from each side of the vertical axis of said vertical frame, a pair of substantially horizontal conveyor means mounted one on each of said arms, each conveyor means comprising a pair of roller means, an endless belt mounted over said roller means having a plurality of transverse cleats affixed thereto, and a housing mounted about said belt cooperating with said belt and said cleats to define a plurality of compartments adapted to confine said articles, a substantially axially positioned loading port disposed at the top of said vertical frame adapted to deposit said articles on each of said endless belts at the axially positioned end of said conveyor means, and a discharge port substantially axially disposed at the bottom portion of said vertical frame arranged to receive returning products from the bottom of the axially positioned ends of said conveyor means, whereby the products charged to said apparatus are conveyed to the periphery of said subassembly for subjecting said products to centrifugal force and whereby said products are subsequently conveyed to the axial portion of said subassembly and discharged.

References Cited

UNITED STATES PATENTS

| | | | |
|---|---|---|---|
| 1,431,978 | 10/1922 | Nesbitt | 34—58 XR |
| 2,447,977 | 8/1948 | Fry et al. | 34—58 |
| 2,521,442 | 9/1950 | Birdseye. | |

FREDERICK L. MATTESON, JR., *Primary Examiner.*

A. D. HERRMANN, *Assistant Examiner.*